Dec. 19, 1933.   D. T. BROWNLEE   1,940,345
AUTOMATIC SHIFTING BUSHING
Filed Dec. 29, 1930

D. T. Brownlee,
INVENTOR.

BY E. T. Silvius,
ATTORNEY.

Patented Dec. 19, 1933

1,940,345

UNITED STATES PATENT OFFICE 1,940,345

AUTOMATIC SHIFTING BUSHING

Dalmar T. Brownlee, Indianapolis, Ind.

Application December 29, 1930
Serial No. 505,313

7 Claims. (Cl. 308—237)

This invention relates to lubrication of journal bearings that are of such character that one member of the bearing oscillates with respect to the companion member, the invention having reference more particularly to means whereby to effectively distribute lubricant in journal bearings of such type as lack continuous rotary movement of either one of the two principal elements of the bearings.

An object of the invention is to provide a journal bearing for oscillating motion of simple and inexpensive construction that shall be more durable and require less attention than those in common use.

It being well known that in ordinary journal bearings subjected to oscillating motion the lubricant applied thereto tends to shift around to the unloaded side of the bearing, with the result that in a short time the loaded side becomes dry and unless lubricated frequently rapid wear results; and, an object of the present invention is to provide an improved bearing whereby thorough distribution of lubricant is effected and uniform wear of the bearing assured.

A further object is to provide improved means for automatically distributing lubricant in such bearing as may be useful in spring shackles in which ordinarily the shackle pin or bolt or its companion member suffers from injurious wear on the loaded side, with resultant objectionable noises.

With the above-mentioned and other objects in view, this invention consists in a bearing provided with a novel bushing between the bearing bore and a shaft that is intermittently rotated in one direction only, by the oscillating member of the bearing, to carry applied lubricant completely around the bearing and to cause the portions of the bearing in loaded contact to be constantly changing to result in evenly wearing with respect to each other; the invention consisting also further in the novel parts and in the combinations and arrangements of parts as hereinafter particularly described and further defined in the appended claims.

Figure 1:
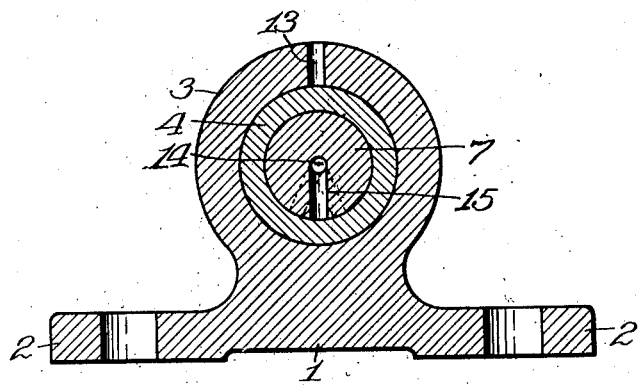
Figure 2:
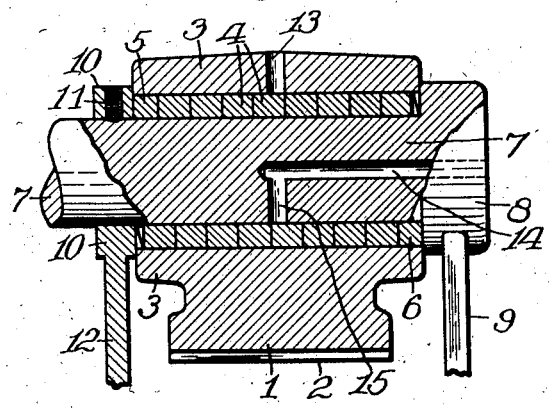
Figure 3:
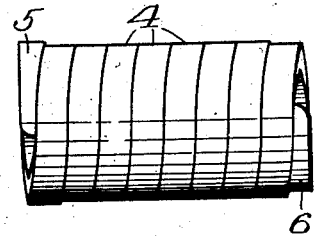
Figure 4:
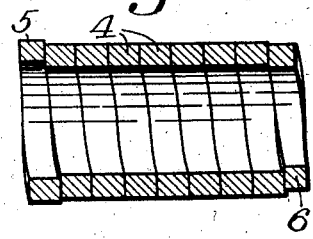

Referring to the accompanying drawing,—Figure 1 is a transverse sectional view of a bearing comprising a shaft and a boxing therefor adapted to be anchored, the bearing including the novel shifting bushing comprised in the invention; Fig. 2 is a longitudinal section of the bearing constructed in accordance with the invention and illustrating one of the practical forms thereof; Fig. 3 is a side view of the shifting bushing as preferably constructed; and Fig. 4 is a longitudinal central section of the bushing.

Similar reference characters in the different figures of the drawing indicate corresponding elements or features of construction herein referred to in detail.

For descriptive purposes the journal bearing herein referred to comprises a shaft member, a boxing member in which the shaft is arranged, and a bushing member arranged in the boxing member and extending about the shaft member. The boxing member may be variously constructed to comprise a suitable main or body portion 1 having an ear 2 or a plurality of ears whereby to secure the boxing member to an object, the boxing member having a suitable bearing member 3 suitably bored to receive a shifting bushing. Preferably the bushing is composed of continuous spring metal wound with a suitable number of turns to comprise a cylindrical bearing portion 4 with usual bearing clearance between the shaft and the bushing and between the bushing and the bearing bore, one or more turns 5 at one end of the bushing being slightly expanded so as to cause frictional engagement with the wall of the bearing bore, and one or more turns 6 at the opposite end of the bushing being slightly contracted so as to cause frictional engagement with the shaft. The shaft 7 shown for descriptive purposes may be variously constructed or formed as to contour, one form having a head 8 on one end that constitutes a collar having contact with one end of the bushing and the bearing member 3, the main portion of the shaft having a cylindrical surface. The head 8 is shown as having an arm 9 fixed thereto whereby to turn the shaft or to hold it relatively to the bearing member 3, or other devices may appropriately be provided for such purpose. A collar 10 is arranged at the opposite end of the bearing member 3 in contact with the opposite end of the bushing and is secured in place on the shaft preferably by means of a set-screw 11, the collar preferably having an arm 12 fixed thereto enabling the collar to turn or to hold the shaft against rotation. The bearing member 3 may have an oil-way 13 therein to conduct oil to the outer side of the bushing. Also the shaft may have an oil-way 14 leading from one end thereof and a lateral oil-way 15 leading from the oil-way 14 to the surface of the shaft to conduct lubricant to the inner side of the bushing. In lieu of the oil-ways described small radial holes may be drilled through the wall of the bushing. Or the bushing element may be wound with a slight opening between the turns to allow the passage of lubricant from one side to the opposite side of the bushing.

The bushing may be composed of steel, bronze or other suitable material, or of composite construction such as steel faced with other suitable material.

The spring bushing should preferably have more than four turns to insure a powerful gripping action, but in situations where the angular movement is small the number of turns must not be large, since the angular movement between the ends of the spring bushing in taking up the bearing clearance must be less than the angular movement of the bearing, otherwise there will not be intermittent rotation of the bushing necessary to attain the objects of the invention.

In practical use, the bearing member 3 being assumed to be stationary and the shaft relatively rotative, as the shaft oscillates so as to turn in one direction the contracted portion 6 of the bushing grips and clutches the bushing to the shaft, so that the shaft turns the bushing in the bearing member 3, the expanded portion 5 of the bushing causing gripping action in the bore of the member 3 upon reverse oscillatory movement of the shaft in the bushing, with the result that continued oscillatory movement of the shaft causes the bushing to have intermittent rotary movement, which action carries the applied lubricant completely around the bearing and causes the portions of the bearing that are in loaded contact to be constantly changing with respect to each other and thus effecting complete distribution of the lubricant.

In some situations the bearing member 3 may be oscillatory and the shaft stationary relatively thereto, depending upon the particular application of the journal bearing, the result of operation being the thorough distribution of lubricant on the bearing.

What is claimed is:

1. An automatic shifting bushing having a cylindrical bearing bushing portion provided at opposite ends respectively with an elastic diametrically expanded portion and an elastic diametrically contracted portion.

2. An automatic shifting spring bushing having a cylindrical load-supporting main portion and opposite end portions and shiftably interposed between a shaft and a bored boxing, one of the end portions being relatively enlarged and automatically expansible and the opposite end portion relatively contracted and automatically contractible.

3. The combination of a bored boxing, a shaft in the boxing having collars spaced apart and fixed to the shaft against opposite ends of the boxing, the collars having arms rigid thereon, and a coiled spring bushing on the shaft within the bore of the boxing between said collars and mainly free to turn relatively thereto, one end coil of the bushing extending outwardly and into frictional clutching contact with the wall of the boxing, the opposite end coil of the bushing extending inwardly and into frictional clutching contact with the surface of the shaft.

4. A bearing bushing composed of coiled elastic material of substantially uniform cross-section constituting a cylindrical helix, the diameter of the helix at one end being slightly smaller, and at the opposite end being slightly larger than the diameter of the middle portion.

5. An automatic shifting bearing bushing coiled from elastic material of substantially uniform cross-section into a cylindrical helix, the diameter of the helix at one end being of reduced diameter for automatic wrapping engagement with a shaft, and the helix at the opposite end being of enlarged diameter for automatic unwrapping engagement with a bearing housing bore.

6. An automatic shifting bearing bushing coiled from elastic material of substantially uniform cross-section into a cylindrical helix, the diameter of the helix at one end being of reduced diameter to constitute a uni-directional clutch in external connection with a shaft, and the diameter of the helix at the opposite end being of enlarged diameter to constitute a uni-directional internal clutch with a bearing housing bore.

7. A bearing bushing composed of elastic material of substantially uniform cross-section coiled to constitute a cylindrical helix, the diameter of the middle portion of the helix being of a size to cause bearing clearance with both a shaft and a bearing bore, the diameter of the helix at one end being diametrically reduced to cause frictional engagement with the shaft, and the diameter of the helix at the opposite end being diametrically enlarged to cause frictional engagement with a bearing bore.

DALMAR T. BROWNLEE.